United States Patent
Qiao et al.

(10) Patent No.: US 12,513,672 B2
(45) Date of Patent: Dec. 30, 2025

(54) TRANSMISSION METHOD, COMMUNICATION APPARATUS AND STORAGE MEDIUM

(71) Applicant: BEIJING XIAOMI MOBILE SOFTWARE CO., LTD., Beijing (CN)

(72) Inventors: Xuemei Qiao, Beijing (CN); Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 321 days.

(21) Appl. No.: 18/271,667

(22) PCT Filed: Jan. 11, 2021

(86) PCT No.: PCT/CN2021/071110
§ 371 (c)(1),
(2) Date: Jul. 11, 2023

(87) PCT Pub. No.: WO2022/147834
PCT Pub. Date: Jul. 14, 2022

(65) Prior Publication Data
US 2024/0008010 A1  Jan. 4, 2024

(51) Int. Cl.
*H04W 72/0446* (2023.01)
*H04L 5/00* (2006.01)

(52) U.S. Cl.
CPC ....... *H04W 72/0446* (2013.01); *H04L 5/0092* (2013.01)

(58) Field of Classification Search
CPC .......................... H04W 72/0446; H04L 5/0092
See application file for complete search history.

(56) References Cited

U.S. PATENT DOCUMENTS

| | | | |
|---|---|---|---|
| 10,880,880 B2 | 12/2020 | Ma et al. | |
| 10,904,909 B2 | 1/2021 | Cao et al. | |
| 2019/0230689 A1 | 7/2019 | Cao et al. | |
| 2020/0053756 A1 | 2/2020 | Sun et al. | |
| 2020/0120651 A1* | 4/2020 | Ma ........................ | H04L 1/0061 |
| 2020/0214084 A1 | 7/2020 | Panteleev et al. | |
| 2020/0351914 A1 | 11/2020 | Dahlman et al. | |
| 2021/0352640 A1* | 11/2021 | Fan ........................ | H04L 1/1822 |

(Continued)

FOREIGN PATENT DOCUMENTS

| | | |
|---|---|---|
| CN | 110034889 A | 7/2019 |
| CN | 110199561 A | 9/2019 |
| CN | 110830184 A | 2/2020 |

(Continued)

OTHER PUBLICATIONS

CNOA issued in Application No. 202180000223.6 dated Nov. 29, 2024 with English translation, (9p).
International Search Report issued in Application No. PCT/CN2021/071110, dated Oct. 12, 2021, with English translation,(4p).
Catt, "Correction on HARQ-ACK generation for DL transmission with single TB when multi-TB is configured", 3GPP TSG-RAN WG1 #103-e, R1-2007804, e-Meeting, Oct. 26-Nov. 13, 2020, (13p).

(Continued)

*Primary Examiner* — Melvin C Marcelo
(74) *Attorney, Agent, or Firm* — Arch & Lake LLP; Hao Tan; Shen Wang

(57) ABSTRACT

The present disclosure relates to a transmission method, a communication apparatus and a storage medium. The transmission method includes: determining that a scheduling period for a transport block (TB) is a non-integer semi-static scheduling period, and determining a symbol location for transmitting the TB.

18 Claims, 8 Drawing Sheets

(56) References Cited

U.S. PATENT DOCUMENTS

2022/0312412 A1 9/2022 Lee et al.
2023/0291505 A1 9/2023 Park et al.

FOREIGN PATENT DOCUMENTS

| CN | 111478784 | A | | 7/2020 | | |
|----|-----------|---|---|--------|---|---|
| CN | 111586845 | A | | 8/2020 | | |
| CN | 111837349 | A | | 10/2020 | | |
| EP | 4576627 | A1 | * | 6/2025 | ........... | H04L 5/0055 |
| KR | 20200116392 | A1 | | 10/2020 | | |
| WO | 2020143723 | A1 | | 7/2020 | | |
| WO | 2020204497 | A1 | | 10/2020 | | |
| WO | 2020222598 | A1 | | 11/2020 | | |
| WO | 2020226403 | A1 | | 11/2020 | | |

OTHER PUBLICATIONS

Extended European Search Report Issued in Application No. 21916888.7 dated Jan. 5, 2024, (12p).

Huawei et al., "Discussion on flexible periodicities for Configured Grant/SPS," 3GPP TSG-RAN WG2 Meeting 105bis, Xi'an, China, Apr. 8-12, 2019, R2-1904374, (5p).

ISA State Intellectual Property Office of the People's Republic of China, Written Opinion of the International Searching Authority Issued in Application No. PCT/CN2021/071110, Oct. 12, 2021, WIPO, with English translation, (6p).

The State Intellectual Property Office of People's Republic of China, "First Office Action", issued in Application No. 202180000223.6 dated Jul. 31, 2024, with English translation, (9p).

* cited by examiner

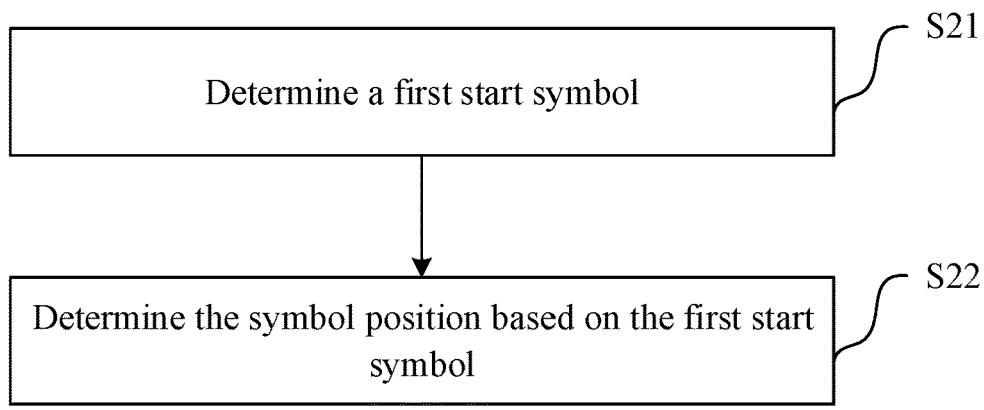
FIG. 3
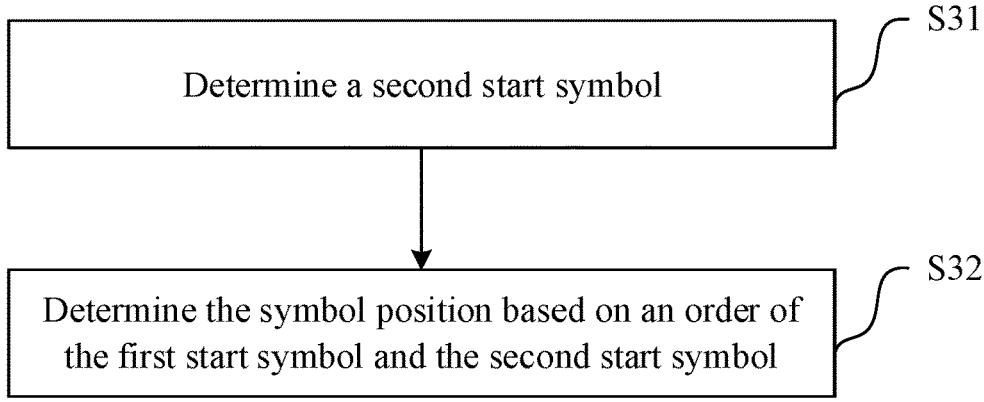
FIG. 4
FIG. 5
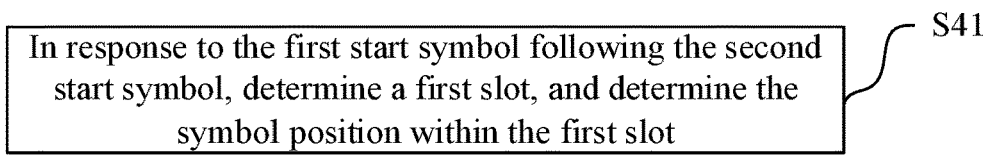
FIG. 6

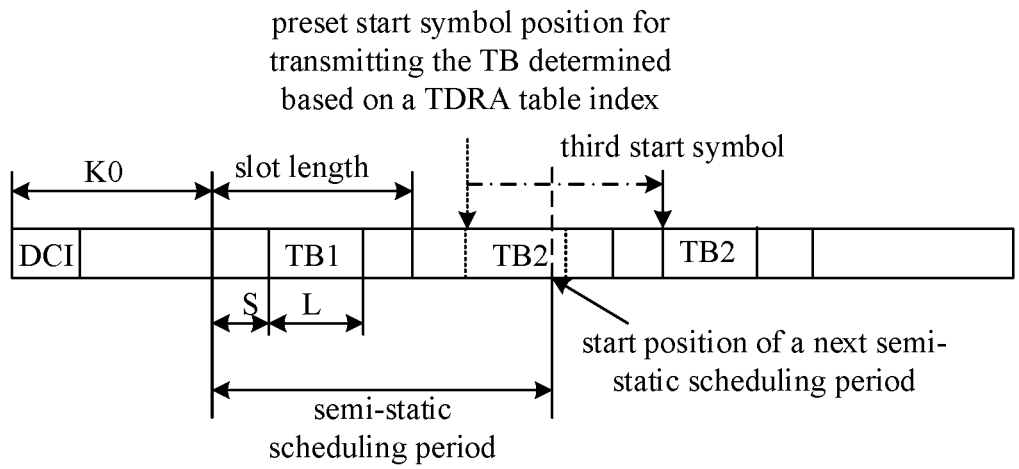
FIG. 7
In response to the first start symbol following the second start symbol, determine the symbol position based on the first start symbol ⎯ S51
FIG. 8
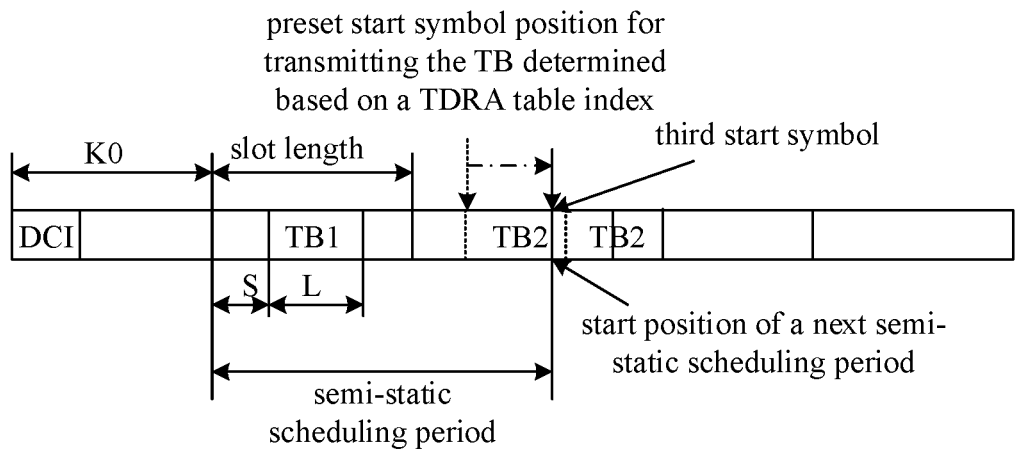
FIG. 9

In response to the first start symbol being before the second start symbol, determine the symbol position based on the second start symbol ⎯ S61
FIG. 10
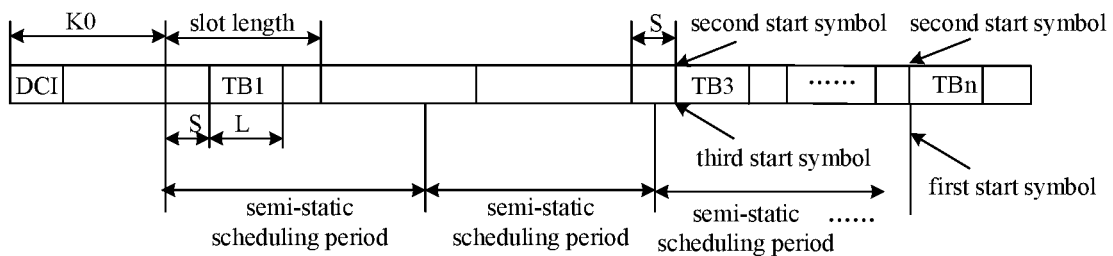
FIG. 11
Determine the first start symbol as a third start symbol for transmitting the TB, and determine the symbol position ⎯ S71
FIG. 12
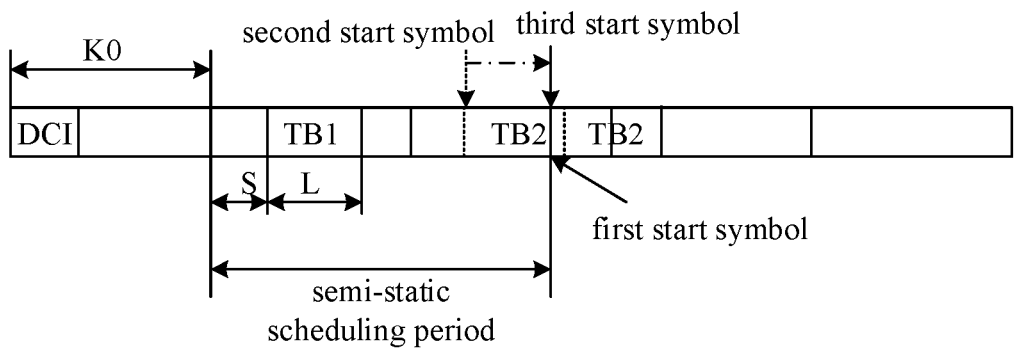
FIG. 13

| Determine a N-th symbol after the first start symbol as the third start symbol for transmitting the TB, and determine the symbol position | ⟵ S81 |

FIG. 14

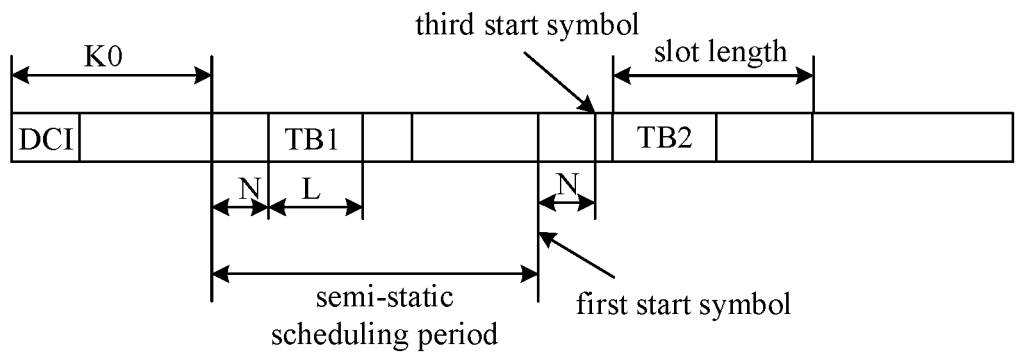

FIG. 15

| In response to a slot where a third start symbol for transmitting the TB is located being different from a slot where an end symbol position of the TB is located, determine a second slot, and re-determine the symbol position within the second slot | ⟵ S91 |

FIG. 16

TRANSMISSION METHOD, COMMUNICATION APPARATUS AND STORAGE MEDIUM

CROSS REFERENCE TO RELATED APPLICATIONS

This application is a National Stage of International Application No. PCT/CN2021/071110, filed on Jan. 11, 2021, the disclosure of which is incorporated herein by reference in its entirety for all purposes.

BACKGROUND

With the continuous development of wireless communication technology, in the new generation of communication technology, extended reality (XR) is an important application scenario in wireless technology. An XR device can periodically generate some data streams. For example, the XR device can generate 45 frames of dependent streaming per second. Based on the characteristics of periodic data stream generation, the XR device has low delay requirements in most cases.

SUMMARY

The present disclosure relates to wireless communication technology, and in particular to a transmission method, a communication apparatus and a storage medium.

According to a first aspect of the embodiments of the present disclosure, there is provided a transmission method, including:
  determining that a scheduling period for a transport block (TB) being a non-integer semi-static scheduling period; and determining a symbol location for transmitting the TB.

According to a second aspect of the embodiments of the present disclosure, there is provided a communication apparatus, including:
  a processor; and a memory configured to store executable instructions by the processor; where the processor is configured to perform the transmission method described in the first aspect or any implementation of the first aspect.

According to a third aspect of the embodiments of the present disclosure, there is provided a non-transitory computer-readable storage medium, where instructions in the storage medium, when are executed by a processor of a mobile terminal, cause the mobile terminal to perform the transmission method described in the first aspect or any implementation of the first aspect.

The above general descriptions and subsequent detailed descriptions are merely illustrative and explanatory, and shall not constitute limitation to the present disclosure.

BRIEF DESCRIPTION OF THE DRAWINGS

The accompanying drawings herein, which are incorporated in and constitute a part of the specification, illustrate examples consistent with the present disclosure, and together with the specification, serve to explain the principles of the present disclosure.

FIG. 3 is a flowchart illustrating a transmission method according to an exemplary embodiment of the present disclosure.

FIG. 4 is a flowchart illustrating another transmission method according to an exemplary embodiment of the present disclosure.

FIG. 5 is a flowchart illustrating yet another transmission method according to an exemplary embodiment of the present disclosure.

FIG. 6 is a flowchart illustrating yet another transmission method according to an exemplary embodiment of the present disclosure.

FIG. 7 is a schematic diagram illustrating determining a first slot according to an exemplary embodiment of the present disclosure.

FIG. 8 is a flowchart illustrating yet another transmission method according to an exemplary embodiment of the present disclosure.

FIG. 9 is a schematic diagram illustrating determining a symbol location according to an exemplary embodiment of the present disclosure.

FIG. 10 is a flowchart illustrating yet another transmission method according to an exemplary embodiment of the present disclosure.

FIG. 11 is a schematic diagram illustrating determining a symbol location according to an exemplary embodiment of the present disclosure.

FIG. 12 is a flowchart illustrating yet another transmission method according to an exemplary embodiment of the present disclosure.

FIG. 13 is a schematic diagram illustrating determining a symbol location according to an exemplary embodiment of the present disclosure.

FIG. 14 is a flowchart illustrating yet another transmission method according to an exemplary embodiment of the present disclosure.

FIG. 15 is a schematic diagram illustrating determining a symbol location according to an exemplary embodiment of the present disclosure.

FIG. 16 is a flowchart illustrating yet another transmission method according to an exemplary embodiment of the present disclosure.

DETAILED DESCRIPTION OF THE EMBODIMENTS

Exemplary embodiments will be described in detail herein, examples of which are illustrated in the accompanying drawings. When the following descriptions involve the drawings, like numerals in different drawings refer to like or similar elements unless otherwise indicated. Implementations described in the following exemplary embodiments do not represent all implementations consistent with the present disclosure. Rather, they are merely examples of apparatuses and methods consistent with some aspects of the present disclosure as detailed in the appended claims.

Figure 1:
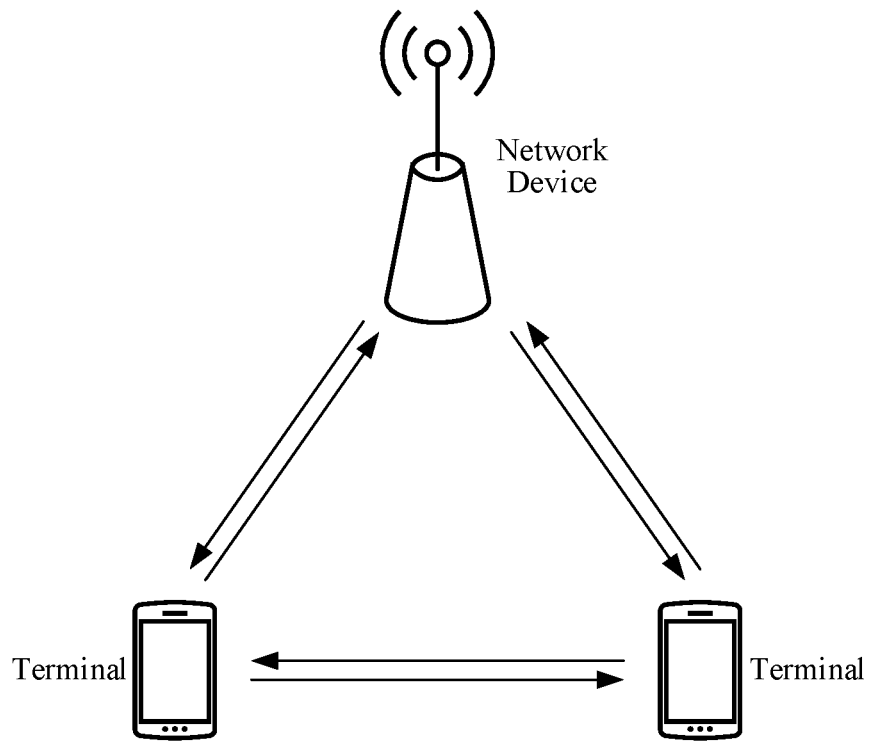
FIG. 1 is a diagram illustrating a communication system architecture including a network device and terminals according to an exemplary embodiment of the present disclosure.

FIG. 1 is a diagram illustrating a communication system architecture including a network device and terminals according to an exemplary embodiment. The communication method provided in the present disclosure can be applied to the communication system architecture shown in FIG. 1. As shown in FIG. 1, a network side device can send signaling based on the architecture shown in FIG. 1.

It can be understood that the communication system architecture including the network device and terminals shown in FIG. 1 is only for schematic illustration, and a wireless communication system may also include other network devices, such as one or more core network devices, one or more wireless relay devices, and one or more wireless backhaul devices, which are not shown in FIG. 1. The number of network devices and terminals included in the wireless communication system is not limited in the embodiments of the present disclosure.

It can be further understood that the wireless communication system in the embodiments of the present disclosure is a network that provides wireless communication functions. Different communication technologies can be adopted in the wireless communication system, such as code division multiple access (CDMA), wideband code division multiple access (WCDMA), time division multiple access (TDMA), frequency division multiple access (FDMA), orthogonal frequency division multiple access (OFDMA), single carrier FDMA (SC-FDMA), carrier sense multiple access with collision avoidance (CSMA/CA). According to the capacity, speed, delay, and other factors of different networks, the network type can be divided into 2G (generation) network, 3G network, 4G network, or future evolution network, such as 5G network which can also be referred to as new radio (NR) network. For the convenience of description, the wireless communication network is sometimes referred to as a network in the present disclosure.

Further, the network device involved in the present disclosure can also be referred to as a radio access network device. The radio access network device can be a base station, an evolved base station (evolved node B), a home base station, an access point (AP) in a wireless fidelity (WIFI) system, a wireless relay node, a wireless backhaul node, a transmission point (TP), or a transmission and reception point (TRP), and can also be a gNB in an NR system. Or, the radio access network device can be components or part of devices that constitute a base station. When the communication system is a vehicle-to-everything (V2X) communication system, the network device can also be a vehicle-mounted device. It should be understood that a specific technology and a specific device form adopted by the network device are not limited in embodiments of the present disclosure.

Further, the terminal involved in the present disclosure can also be referred to as a terminal device, a user equipment (UE), a mobile station (MS), a mobile terminal (MT), etc., it is a device that provides voice and/or data connectivity to the user. For example, the terminal can be a handheld device with a wireless connection function, a vehicle-mounted device with a wireless connection function, and the like. At present, some examples of the terminal are a mobile phone, a pocket personal computer (PPC), a handheld computer, a personal digital assistant (PDA), a laptop, a tablet, a wearable device, a vehicle-mounted device, or virtual reality (VR) glasses, etc. It should be understood that a specific technology and a specific device form adopted by the terminal are not limited in embodiments of the present disclosure.

In the new generation of communication technology, extended reality (XR) and cloud gaming are important applications of 5G. In the research of related technologies, XR and cloud gaming include the following technologies:
VR1: "viewport dependent streaming";
VR2: "split rendering: viewport;
AR1: "XR distributed computing";
AR2: "XR conversational";
CG: "cloud gaming".

In some embodiments, an XR device can be directly connected to the network through down link (DL)/up link (UL) communication.

In the XR device, some data streams can be generated periodically, such as viewport dependent streaming of 45 frames per second can be generated. It is considered to schedule a transport block (TB) based on semi-persistent scheduling (SPS), in other words, SPS should be the candidate considered to accommodate the XR traffic. In addition, most of the use cases in XR have low latency requirements.

In related art, supported SPS periods are integer periods, for example, optional SPS periods are {10 ms, 20 ms, 32 ms, 40 ms, 64 ms, 80 ms, 128 ms, 160 ms, 320 ms, 640 ms}. When scheduling a TB based on an integer SPS period, slots, starting symbols, and symbol lengths for transmitting the TB in different SPS periods are the same. Therefore, symbol locations of the TB can be determined based on a time domain resource allocation (TDRA) table. The symbol locations can include the slots, the starting symbols, and the symbol lengths of the TB. An index of the TDRA table is provided through radio resource control (RRC) signaling/downlink control information (DCI) signaling, and the slots, the starting symbols, and the symbol lengths of the TB are determined by the index of the TDRA table. A TDRA index provided by the RRC signaling is used for type 1 configured grant (CG) scheduling (type 1 CG). A TDRA index provided by the DCI signaling is used for type 2 CG scheduling and SPS (type 2 CG and SPS). The CG is used for uplink data transmission, and the SPS is used for downlink data transmission.

However, in related art, it is only supported that the SPS periods are integer periods, that is, a time domain resource allocation manner under a semi-static scheduling mechanism with integer periods is supported. An embodiment of the present disclosure provides a scenario that can be applied to an SPS period being a non-integer period. In this scenario, a starting symbol location for transmitting the TB determined by the TDRA table may appear before a starting symbol location of the non-integer SPS period, and the semi-static scheduling with a non-integer period can be realized.

Figure 2:
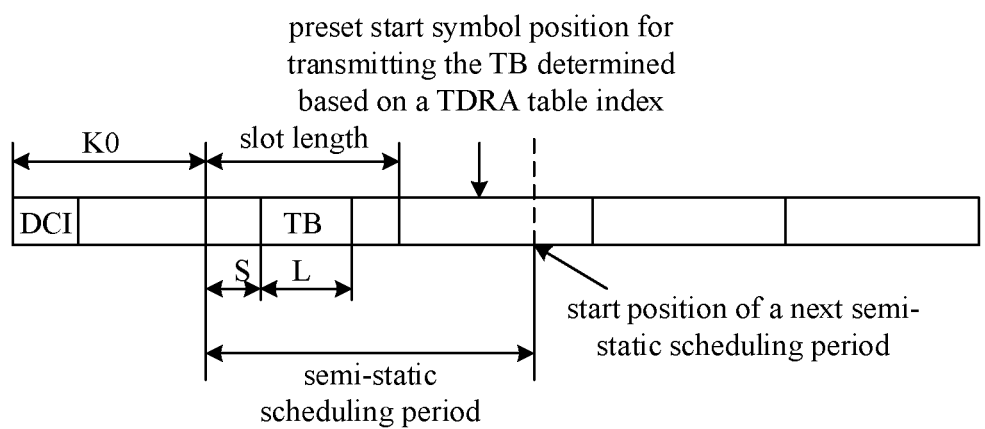
FIG. 2 is a schematic diagram illustrating a relationship between a non-integer period and a slot according to an exemplary embodiment of the present disclosure.

In communication network related technologies, as mentioned above, the slot, the starting symbol, and the symbol length of the TB can be determined through the index of the TDRA table. Moreover, slots, starting symbols, and symbol lengths of the TB at transmission occasions for different integer SPS periods determined based on the TDRA table are the same. FIG. 2 is a schematic diagram illustrating a relationship between a non-integer period and a slot. As shown in FIG. 2, for a non-integer SPS period, the starting symbol of the TB determined by the TDRA table does not match the starting symbol of the non-integer SPS period. In FIG. 2, a value of K0 indicates whether a physical downlink control channel (PDCCH) and its scheduled physical downlink shared channel (PDSCH) are scheduled in the same slot or across slots. The value of K0 is a slot difference between the slot occupied by PDCCH and the slot occupied by the scheduled PDSCH. The value of K0 has a value set that is configured by a network device to terminals through RRC signaling, for example, the value set can be {0, 1, 2 . . . }. If K0=0, it means that PDCCH and PDSCH are in the same slot, that is, "same slot scheduling". If K0>0, it means that PDCCH and PDSCH are not in the same slot, that is, "cross slot scheduling". The network device can directly indicate the value of K0 to the terminals, or the network device can configure a TDRA table for the terminals, which includes index values and values of K0 corresponding to the index values. The network device can indirectly indicate the values of K0 to the terminals by indicating the index values to the terminals.

Based on this, the present disclosure provides a transmission method for TB scheduling with a non-integer SPS period, which determines a starting symbol of a TB for transmitting the TB within a non-integer SPS period, thus solving the problem that the starting symbol of the TB determined by the TDRA table does not match the starting symbol of the non-integer SPS period. It should be noted that all embodiments in the present disclosure can be applied to both a network side device and a terminal side device.

FIG. 3 is a flowchart illustrating a transmission method according to an exemplary embodiment. As shown in FIG. 3, the transmission method is applied to a terminal, and include step S11.

In step S11, in response to a scheduling period for a TB being a non-integer semi-static scheduling period, a symbol location for transmitting the TB is determined.

In the embodiment of the present disclosure, when scheduling the TB, occasions for transmitting the TB are included in different scheduling periods. In the business of some devices, there will be non-integer periodic data streams, for example, periodic data streams of 60 frames per second or 45 frames per second are generated. For example, if 60 frames of periodic data streams are generated per second, and the semi-static scheduling period is an SPS period, ⅟60 second is an SPS period. In this case, there is a non-integer millisecond period, that is, 16.67 ms is an SPS period.

In response to the scheduling period for the TB being a non-integer semi-static scheduling period (for example, 16.67 ms is a semi-static scheduling period), the symbol location for transmitting the TB in the period is determined. The symbol location can at least include a slot where UE shall transmit or receive the TB, the starting symbol S relative to the start of the slot, or the number of consecutive symbols L counting from the symbol S allocated for the TB transmission or reception.

In the transmission method of the present disclosure, for a non-integer semi-static scheduling period, there is provided a solution to determine the symbol location for transmitting TB in the non-integer semi-static scheduling period, which can avoid the problem that the starting symbol of the scheduling the TB does not match the starting symbol of the non-integer semi-static scheduling period.

The technical solution provided by the embodiments of the present disclosure can include the following beneficial effects: the symbol location for transmitting the TB is determined by the non-integer semi-static scheduling period for scheduling the TB, which can solve the problem of mismatch between the starting symbol for transmitting the TB and the starting symbol of non-integer semi-static scheduling period when determining the symbol location of the scheduled TB in the non-integer semi-static scheduling period, thereby meeting the requirement of low delay of the non-integer semi-static scheduling period for scheduling TB.

FIG. 4 is a flowchart illustrating a transmission method according to an exemplary embodiment. As shown in FIG. 4, determining the symbol location for transmitting the TB includes the following steps.

In step S21, a first starting symbol is determined.

The first starting symbol is a starting location of the semi-static scheduling period. In all embodiments of the present disclosure, for the convenience of description, a starting symbol location of the semi-static scheduling period is referred to as the first starting symbol.

In step S22, the symbol location is determined based on the first starting symbol.

In the embodiment of the present disclosure, the starting location of each semi-static scheduling period is determined based on the location of starting the semi-static scheduling period. The symbol location for transmitting the TB based on the starting location of each semi-static scheduling period. The symbol location for transmitting the TB includes a starting symbol location for transmitting the TB. In all embodiments of the present disclosure, for ease of description, the starting symbol location for transmitting the TB is referred to as a third starting symbol. It can be understood that the determined third starting symbol follows the first starting symbol, or the determined third starting symbol coincides with the first starting symbol.

The embodiment of the present disclosure provides a transmission method that can be implemented separately or in conjunction with any other embodiment of the present disclosure. The transmission method in the embodiment of the present disclosure includes: determining the symbol location for transmitting the TB based on the first starting symbol of the semi-static scheduling period.

FIG. 5 is a flowchart illustrating a transmission method according to an exemplary embodiment. As shown in FIG. 5, determining the symbol location for transmitting the TB based on the first starting symbol of the semi-static scheduling period includes the following steps.

In step S31, a second starting symbol is determined.

The second starting symbol is a preset starting symbol location for transmitting the TB determined based on a TDRA table. In the embodiment of the present disclosure, for the convenience of description, the preset starting symbol location for transmitting the TB determined based on the TDRA table is referred to as the second starting symbol. The type of the TDRA table can be selected or modified according to different application scenarios and the principle of the present disclosure. The type of the TDRA table is not limited in the embodiments of the present disclosure.

In step S32, the symbol location is determined based on an order of the first starting symbol and the second starting symbol.

In the embodiment of the present disclosure, the determined second starting symbol is the same in each slot, so the order of the first starting symbol and the second starting symbol is determined based on the comparison between the first starting symbol of each period and the second starting symbol on the slot.

The embodiment of the present disclosure provides a transmission method that can be implemented separately or in conjunction with any other embodiment of the present disclosure. The transmission method in the embodiment of the present disclosure includes: determining the symbol location based on the order of the first starting symbol and the second starting symbol.

FIG. 6 is a flowchart illustrating a transmission method according to an exemplary embodiment. As shown in FIG. 6, determining the symbol location based on the order of the first starting symbol and the second starting symbol includes step S41.

In step S41, in response to the first starting symbol following the second starting symbol, a first slot is determined, and the symbol location is determined within the first slot.

FIG. 7 is a schematic diagram illustrating determining the first slot according to an exemplary embodiment. In an exemplary embodiment of the present disclosure, as shown in FIG. 7, L represents the symbol length of a TB, and S represents an interval length between the second starting symbol for transmitting the TB and symbol #0 in the same slot. In an embodiment, in response to the first starting symbol following the second starting symbol, as shown in TB2 (dashed line) in FIG. 7, the first slot is determined. In an embodiment of the present disclosure, the first slot is a next adjacent slot of a slot where the TB2 (dashed line) is located. The symbol location for transmitting the TB2 (solid line) is determined within the first slot.

In an embodiment of the present disclosure, determining the symbol location within the first slot includes at least one of the following manners:
the symbol location is determined based on a communication protocol;
the symbol location is determined based on one or more preset parameters;
the symbol location is determined based on a preset rule;
the symbol location is determined based on a TDRA table; or
the symbol location is determined based on an indication from a network device.

The embodiment of the present disclosure provides a transmission method that can be implemented separately or in conjunction with any other embodiment of the present disclosure. The transmission method in the embodiment of the present disclosure includes: determining the symbol location based on the order of the first starting symbol and the second starting symbol.

FIG. 8 is a flowchart illustrating a transmission method according to an exemplary embodiment. As shown in FIG. 8, determining the symbol location based on the order of the first starting symbol and the second starting symbol includes step S51.

In step S51, in response to the first starting symbol following the second starting symbol, the symbol location is determined based on the first starting symbol.

FIG. 9 is a schematic diagram illustrating determining the symbol location according to an exemplary embodiment. In an exemplary embodiment of the present disclosure, as shown in FIG. 9, L represents the symbol length of a TB, and S represents an interval length between the second starting symbol for transmitting the TB and symbol #0 in the same slot.

In an exemplary embodiment of the present disclosure, in response to the first starting symbol following the second starting symbol, in other words, it is determined that a time domain resource position for transmitting the TB is before the starting symbol of the semi-static scheduling period, the symbol location is determined based on the first starting symbol.

In an implementation, as shown in FIG. 9, the second starting symbol (i.e., the preset starting symbol location for transmitting the TB determined based on an index of the TDRA table) can be delayed to the location of the first starting symbol (i.e., the starting symbol location of the semi-static scheduling period), that is, the first starting symbol can be used as the starting symbol for transmitting the TB2 (solid line) (i.e., the third starting symbol). In an implementation, the location where N symbols are separated from the first starting symbol is used as the third starting symbol. In other words, the N-th symbol after the first starting symbol is determined as the starting symbol for transmitting the TB2 (solid line) (i.e., the third starting symbol).

In any of the above embodiments, N can be determined based on at least one of:
a preset value in a protocol;
an indication from a network device; or
an index of a TDRA table.

The embodiment of the present disclosure provides a transmission method that can be implemented separately or in conjunction with any other embodiment of the present disclosure. The transmission method in the embodiment of the present disclosure includes: determining the symbol location based on the order of the first starting symbol and the second starting symbol.

FIG. 10 is a flowchart illustrating a transmission method according to an exemplary embodiment. As shown in FIG. 10, the symbol location is determined based on the order of the first starting symbol and the second starting symbol includes step S61.

In step S61, in response to the first starting symbol being before the second starting symbol, the symbol location is determined based on the second starting symbol.

FIG. 11 is a schematic diagram illustrating determining the symbol location according to an exemplary embodiment. In an exemplary embodiment of the present disclosure, as shown in FIG. 11, L represents the symbol length of a TB, and S represents an interval length between the second starting symbol for transmitting the TB and symbol #0 in the same slot.

In an implementation, as shown in FIG. 7, the first starting symbol is before the second starting symbol, as shown in TB1 in FIG. 7. The preset starting symbol location for transmitting the TB determined by the TDRA table (i.e., the second starting symbol) is determined as the third starting symbol in the symbol location for transmitting the TB, and the symbol location of the TB is determined. The second starting symbol corresponding to the index of the TDRA table can be determined through the index.

In an embodiment, if the first starting symbol is before the second starting symbol, as shown in TB3 in FIG. 11, the symbol location for transmitting TB3 is determined based on the second starting symbol of TB3.

In an implementation, if the first starting symbol and the second starting symbol are located at the same location, as shown in TBn in FIG. 11, the symbol location for transmitting TBn can be determined based on the starting symbol for transmitting TBn (i.e., the second starting symbol).

The embodiment of the present disclosure provides a transmission method that can be implemented separately or in conjunction with any other embodiment of the present disclosure. The transmission method in the embodiment of the present disclosure includes: determining the symbol location based on the first starting symbol.

FIG. 12 is a flowchart illustrating a transmission method according to an exemplary embodiment. As shown in FIG.

12, determining the symbol location based on the first starting symbol includes step S71.

In step S71, the first starting symbol is determined as a third starting symbol for transmitting the TB, and the symbol location is determined.

FIG. 13 is a schematic diagram illustrating determining the symbol location according to an exemplary embodiment. In an exemplary embodiment of the present disclosure, as shown in FIG. 13, L represents the symbol length of TB, and S represents an interval length between the second starting symbol for transmitting the TB and the first starting symbol.

In an embodiment of the present disclosure, as shown in FIG. 13, the first starting symbol is determined as the third starting symbol for transmitting the TB2 (solid line), and the symbol location for transmitting the TB2 (solid line) is determined based on the third starting symbol.

The embodiment of the present disclosure provides a transmission method that can be implemented separately or in conjunction with any other embodiment of the present disclosure. The transmission method in the embodiment of the present disclosure includes: determining the symbol location for transmitting the TB based on the first starting symbol.

FIG. 14 is a flowchart illustrating a transmission method according to an exemplary embodiment. As shown in FIG. 14, determining the symbol location based on the first starting symbol includes step S81.

In step S81, a N-th symbol after the first starting symbol is determined as the third starting symbol for transmitting the TB, and the symbol location is determined.

FIG. 15 is a schematic diagram illustrating determining the symbol location according to an exemplary embodiment. In an exemplary embodiment of the present disclosure, as shown in FIG. 15, L is the symbol length of TB.

In an embodiment of the present disclosure, as shown in FIG. 15, the N-th symbol after the first starting symbol is determined as the third starting symbol, and the symbol location of the TB2 (solid line) is determined based on the third starting symbol.

In an embodiment of the present disclosure, the N-th symbol is determined based on a predefined rule; or the N-th symbol is determined based on an indication from a network device; or the N-th symbol is equal to a preset value indicated by TDRA.

FIG. 16 is a flowchart illustrating a transmission method according to an exemplary embodiment. As shown in FIG. 16, the transmission method further includes step S91.

In step S91, in response to a slot where a third starting symbol for transmitting the TB is located being different from a slot where an end symbol location of the TB is located, a second slot is determined, and the symbol location is re-determined within the second slot.

Figure 17:
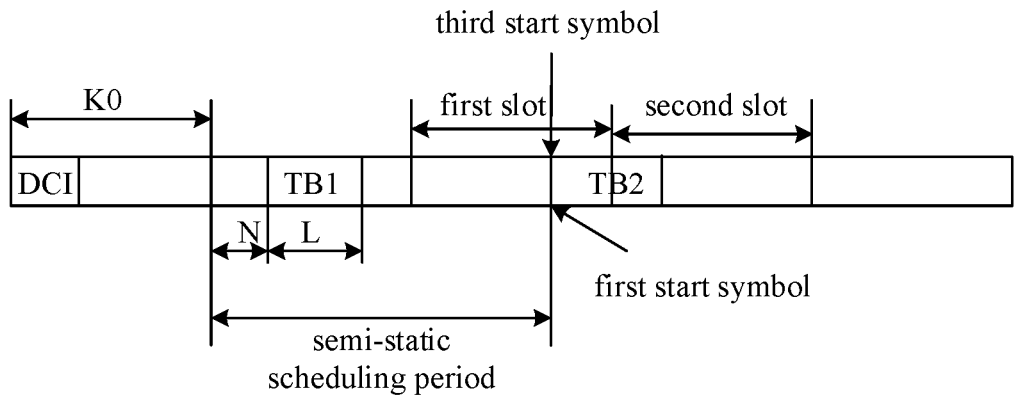
FIG. 17 is a schematic diagram illustrating TB cross slots according to an exemplary embodiment of the present disclosure.

FIG. 17 is a schematic diagram illustrating TB cross slots according to an exemplary embodiment. In an exemplary embodiment of the present disclosure, as shown in FIG. 17, L represents the symbol length of TB, and N represents an interval length between the second starting symbol for transmitting the TB and the first starting symbol.

In an embodiment of the present disclosure, as shown in FIG. 17, in response to a slot where the third starting symbol for transmitting the TB is located being different from the slot where the end symbol location of the TB is located (for example, TB2 is between two slots), it is determined that the TB is transmitted in the second slot, and the symbol location is re-determined within the second slot. The second slot is a next adjacent slot of a slot where the third starting symbol is located.

Figure 18:
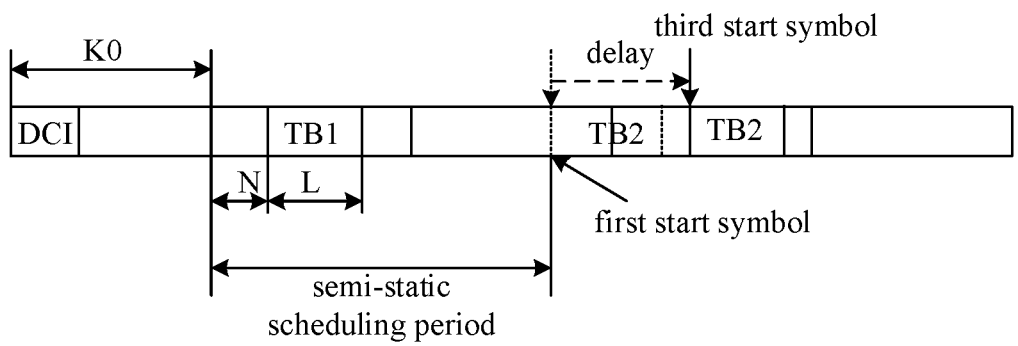
FIG. 18 is a schematic diagram illustrating determining a symbol location according to an exemplary embodiment of the present disclosure.

FIG. 18 is a schematic diagram illustrating determining the symbol location according to an exemplary embodiment. In an exemplary embodiment of the present disclosure, as shown in FIG. 18, L represents the symbol length of TB, and N represents an interval length between the second starting symbol for transmitting the TB and the first starting symbol. As shown in FIG. 18, TB2 is delayed to the second slot, and the symbol location is re-determined within the second slot.

In an embodiment of the present disclosure, re-determining the symbol location within the second slot includes at least one of the following manners:
  re-determining the symbol location based on a predefined rule;
  re-determining the symbol location based on a TDRA table; or
  re-determining the symbol location based on a symbol indicated by a network device.

In an embodiment of the present disclosure, the semi-static scheduling period can be a semi-persistent scheduling (SPS) period or a configured grant period, which is not specifically limited herein. In the embodiments of the present disclosure, TB1, TB2, TB3, etc. are descriptions of TB, each of which has the same symbol length.

It should be noted that any embodiment provided in the present disclosure can be applied to a terminal, a base station, and a network side device, which is not limited in the embodiments of the present disclosure.

Any embodiment in the present disclosure can be implemented separately or in any combination, which is not limited in the embodiments of the present disclosure.

Based on the same concept, an embodiment of the present disclosure also provides a transmission apparatus.

It can be understood that in order to realize the above functions, the transmission apparatus provided in the embodiments of the present disclosure includes hardware structures and/or software modules for performing various functions. Combining units and algorithm steps of each example in the embodiments of the present disclosure, the embodiments of the present disclosure can be implemented in the form of hardware or a combination of hardware and computer software. Whether a certain function is executed in hardware or hardware driven by computer software depends on the specific application and design constraints of the technical solution. Those skilled in the art may use different methods to implement the described functions for each specific application, but such implementation should not be considered beyond the scope of the technical solution in the embodiments of the present disclosure.

Figure 19:
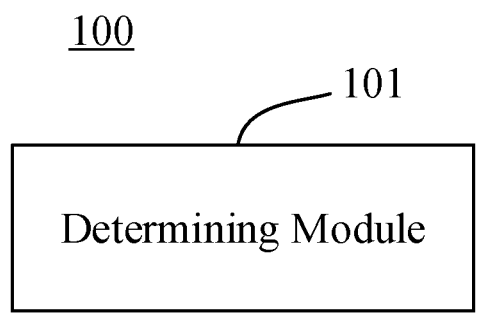
FIG. 19 is a block diagram illustrating a transmission apparatus according to an exemplary embodiment of the present disclosure.

FIG. 19 is a block diagram of a transmission apparatus according to an exemplary embodiment. Referring to FIG. 19, the transmission apparatus 100 includes a determining module 101.

The determining module 101 is configured to determine, in response to a scheduling period for a transport block (TB) being a non-integer semi-static scheduling period, a symbol location for transmitting the TB.

In an embodiment of the present disclosure, the determining module 101 is configured to determine a first starting symbol, where the first starting symbol is located at a beginning of the semi-static scheduling period; and determine the symbol location based on the first starting symbol.

In an embodiment of the present disclosure, the determining module 101 is configured to determine a second starting symbol, where the second starting symbol is a preset starting symbol location for transmitting the TB determined based on a time domain resource allocation (TDRA) table;

and determine the symbol location based on an order of the first starting symbol and the second starting symbol.

In an embodiment of the present disclosure, the determining module 101 is configured to, in response to the first starting symbol following the second starting symbol, determine a first slot, and determine the symbol location within the first slot; where the first slot is a next adjacent slot of a slot where the TB is located.

In an embodiment of the present disclosure, determining the symbol location within the first slot includes at least one of:
  determining the symbol location based on a preset rule;
  determining the symbol location based on the TDRA table; or
  determining the symbol location based on an indication from a network device.

In an embodiment of the present disclosure, the determining module 101 is configured to, in response to the first starting symbol following the second starting symbol, determine the symbol location based on the first starting symbol; or, in response to the first starting symbol being before the second starting symbol, determine the symbol location based on the second starting symbol.

In an embodiment of the present disclosure, the determining module 101 is configured to determine the first starting symbol as a third starting symbol for transmitting the TB, and determine the symbol location; or, determine a N-th symbol after the first starting symbol as the third starting symbol for transmitting the TB, and determine the symbol location.

In an embodiment of the present disclosure, the N-th symbol is determined based on a predefined rule; or, the N-th symbol is determined based on an indication from a network device.

In an embodiment of the present disclosure, the determining module 101 is further configured to, in response to a slot where a third starting symbol for transmitting the TB is located being different from a slot where an end symbol location of the TB is located, determine a second slot, and re-determine the symbol location within the second slot; where the second slot is a next adjacent slot of a slot where the third starting symbol is located.

In an embodiment of the present disclosure, re-determining the symbol location within the second slot includes at least one of:
  re-determining the symbol location based on a predefined rule;
  re-determining the symbol location based on a time domain resource allocation (TDRA) table; or
  re-determining the symbol location based on a symbol indicated by a network device.

With regard to the apparatus in the above embodiment, the specific manner in which each module performs operations have been described in detail in the method embodiments, and will not be explained in detail herein.

Figure 20:
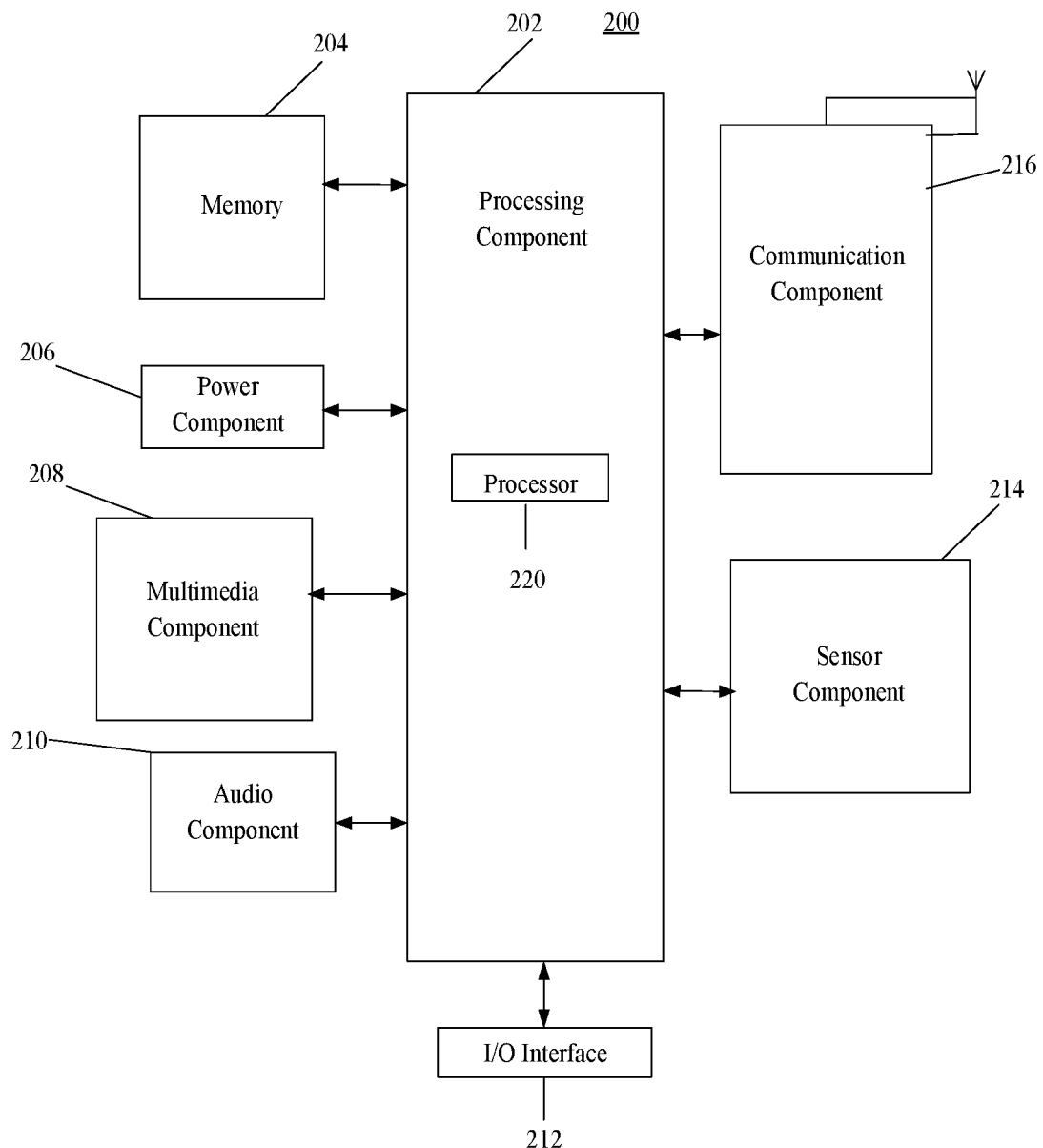
FIG. 20 is a block diagram illustrating an apparatus for transmission according to an exemplary embodiment of the present disclosure.

FIG. 20 is a block diagram of an apparatus 200 for transmission according to an exemplary embodiment. For example, the apparatus 200 may be a mobile phone, a computer, a digital broadcasting terminal, a message transceiver device, a game console, a tablet device, a medical device, a fitness device, and a personal digital assistant.

As illustrated in FIG. 20, the apparatus 200 may include one or more of the following components: a processing component 202, a memory 204, a power component 206, a multimedia component 208, an audio component 210, an input/output (I/O) interface 212, a sensor component 214, and a communication component 216.

The processing component 202 typically controls overall operations of the apparatus 200, such as the operations associated with display, telephone calls, data communications, camera operations, and recording operations. The processing component 202 may include one or more processors 220 to execute instructions, so as to perform all or part of the steps in the above described method. Moreover, the processing component 202 may include one or more modules which facilitate the interaction between the processing component 202 and other components. For example, the processing component 202 may include a multimedia module to facilitate the interaction between the multimedia component 208 and the processing component 202.

The memory 204 is configured to store various types of data to support the operation of the apparatus 200. Examples of such data include instructions for any applications or methods operated on the apparatus 200, contact data, phonebook data, messages, pictures, video, etc. The memory 204 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a programmable read-only memory (PROM), a Read-Only Memory (ROM), a magnetic memory, a flash memory, a magnetic or optical disk.

The power component 206 provides power to various components of the apparatus 200. The power component 206 may include a power management system, one or more power sources, and any other components associated with the generation, management, and distribution of power for the apparatus 200.

The multimedia component 208 includes a screen providing an output interface between the apparatus 200 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense duration and a pressure associated with the touch or swipe action. In some embodiments, the multimedia component 208 includes a front-facing camera and/or a rear-facing camera. When the apparatus 200 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 210 is configured to output and/or input audio signals. For example, the audio component 210 includes a microphone (MIC) configured to receive an external audio signal when the apparatus 200 is in an operation mode, such as a call mode, a recording mode, and a voice recognition mode. The received audio signal may be further stored in the memory 204 or transmitted via the communication component 216. In some embodiments, the audio component 210 further includes a speaker configured to output audio signals.

The I/O interface 212 provides an interface between the processing component 202 and peripheral interface modules, such as a keyboard, a click wheel, buttons, and the like. The buttons may include, but are not limited to, a home button, a volume button, a starting button, and a locking button.

The sensor component 214 includes one or more sensors configured to provide status assessments of various aspects of the apparatus 200. For instance, the sensor component 214 may detect an open/closed status of the apparatus 200, relative positioning of components, e.g., the display and the keypad of the apparatus 200, the sensor component 214 may also detect a change in position of the apparatus 200 or a component of the apparatus 200, the presence or absence of contact between the user and apparatus 200, an orientation or an acceleration/deceleration of the apparatus 200, and a change in temperature of the apparatus 200. The sensor component 214 may include a proximity sensor configured to detect the presence of nearby objects without any physical contact. The sensor component 214 may also include a light sensor, such as a CMOS or CCD image sensor, for use in imaging applications. In some embodiments, the sensor component 214 may also include an accelerometer sensor, a gyroscope sensor, a magnetic sensor, a pressure sensor, or a temperature sensor.

The communication component 216 is configured to facilitate communication, wired or wirelessly, between the apparatus 200 and other devices. The apparatus 200 can access a wireless network based on a communication standard, such as WiFi, 2G, or 3G, or a combination thereof. In an exemplary embodiment, the communication component 216 receives a broadcast signal or broadcast associated information from an external broadcast management system via a broadcast channel. In an exemplary embodiment, the communication component 216 further includes a near field communication (NFC) module to facilitate short-range communication. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above method.

In exemplary embodiments, there is also provided a non-transitory computer readable storage medium including instructions, such as the memory 204 including instructions, executable by the processors 220 in the apparatus 200 for performing the above method. For example, non-transitory computer-readable storage medium may be a ROM, a RAM, a CD-ROM, a magnetic tape, a floppy disc, an optical data storage device, and the like.

Figure 21:
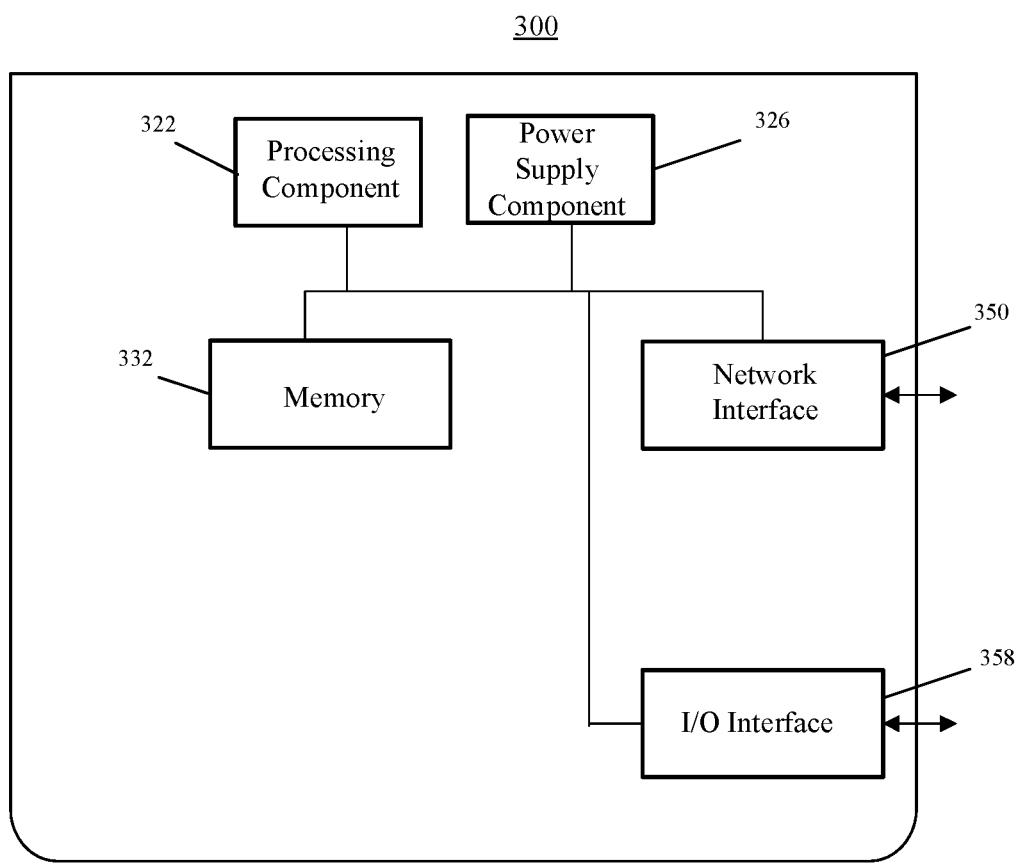
FIG. 21 is a block diagram illustrating another apparatus for transmission according to an exemplary embodiment of the present disclosure.

FIG. 21 is a block diagram of an apparatus 300 for transmission according to an exemplary embodiment. For example, the apparatus 300 can be provided as a server. Referring to FIG. 21, the apparatus 300 includes a processing component 322, which further includes one or more processors, and memory resources represented by a memory 332, for storing instructions that can be executed by the processing component 322, such as application programs. The application programs stored in the memory 332 may include one or more modules each corresponding to a set of instructions. In addition, the processing component 322 is configured to execute instructions to perform the above communication method.

The apparatus 300 may also include a power supply component 326 configured to perform power management of the apparatus 300, a wired or wireless network interface 350 configured to connect the apparatus 300 to the network, and an input output (I/O) interface 358. The apparatus 300 can operate operating systems stored in the memory 332, such as Windows Server", Mac OS X™, Unix™, Linux™, FreeBSD™, or similar.

It can be further understood that in the present disclosure, "multiple" refers to two or more, and other quantifiers are similar to it. "and/or" describes an association relationship of associated objects, indicating that there can be three types of relationships. For example, A and/or B, which can mean that the existence of A alone, the existence of A and B simultaneously, and the existence of B alone. The character "/" generally indicates that there is an "or" relationship between the context objects. The singular forms "a", "this", and "the" are also intended to include the plural form, unless the context clearly indicates other meanings.

It can be further understood that the terms "first", "second", etc. are used to describe various information, but the information should not be limited to these terms. These terms are only used to distinguish the same type of information from each other and do not indicate a specific order or degree of importance. In fact, expressions such as "first" and "second" can be used interchangeably. For example, without departing from the scope of the present disclosure, the first information can also be referred to as the second information, and similarly, the second information can also be referred to as the first information.

It can be further understood that in the embodiments of the present disclosure, although the operations are described in a specific order in the accompanying drawings, they should not be understood as requiring that these operations be performed in the specific order or serial order shown, or that all the operations shown should be performed to obtain the desired results. In certain circumstances, multitasking and parallel processing may be advantageous.

Other embodiments of the present disclosure will be apparent to those skilled in the art from consideration of the specification and practice of the present disclosure disclosed herein. The present disclosure is intended to cover any variations, uses, or adaptations of the present disclosure following the general principles thereof and including common knowledge or common technical means in the technical field that are not disclosed in the present disclosure. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A transmission method, comprising:
   determining that a scheduling period for a transport block (TB) is a non-integer semi-static scheduling period; and
   determining a symbol location for transmitting the TB, wherein determining the symbol location for transmitting the TB comprises:
      determining a first starting symbol, wherein the first starting symbol is located at a beginning of the semi-static scheduling period; and
      determining the symbol location based on the first starting symbol.

2. The transmission method according to claim 1, wherein determining the symbol location based on the first starting symbol comprises:
   determining a second starting symbol, wherein the second starting symbol is a preset starting symbol location for transmitting the TB determined based on a time domain resource allocation (TDRA) table; and
   determining the symbol location based on an order of the first starting symbol and the second starting symbol.

3. The transmission method according to claim 2, wherein determining the symbol location based on the order of the first starting symbol and the second starting symbol comprises:
   determining that the first starting symbol follows the second starting symbol; and
   determining a first slot and the symbol location within the first slot;
   wherein the first slot is a next adjacent slot of a slot where the second starting symbol is located.

4. The transmission method according to claim 3, wherein determining the symbol location within the first slot comprises at least one of:
   determining the symbol location based on a communication protocol;
   determining the symbol location based on one or more preset parameters;
   determining the symbol location based on a preset rule;
   determining the symbol location based on the TDRA table; or
   determining the symbol location based on an indication from a network device.

5. The transmission method according to claim 2, wherein determining the symbol location based on the order of the first starting symbol and the second starting symbol comprises:
   determining that the first starting symbol follows the second starting symbol; and
   determining the symbol location based on the first starting symbol.

6. The transmission method according to claim 1, wherein determining the symbol location based on the first starting symbol comprises:
   determining the first starting symbol as a third starting symbol for transmitting the TB; and
   determining the symbol location based on the third starting symbol;
   wherein the third starting symbol is a starting symbol location for transmitting the TB.

7. The transmission method according to claim 1, further comprising:
   determining that a slot where a third starting symbol for transmitting the TB is located is different from a slot where an end symbol location of the TB is located; and
   determining a second slot, and re-determining the symbol location within the second slot;
   wherein the second slot is a next adjacent slot of a slot where the third starting symbol is located.

8. The transmission method according to claim 7, wherein re-determining the symbol location within the second slot comprises at least one of:
   re-determining the symbol location based on a predefined rule;
   re-determining the symbol location based on a time domain resource allocation (TDRA) table; or
   re-determining the symbol location based on a symbol indicated by a network device.

9. The transmission method according to claim 2, wherein determining the symbol location based on the order of the first starting symbol and the second starting symbol comprises:
   determining that the first starting symbol is before the second starting symbol; and
   determining the symbol location based on the second starting symbol.

10. The transmission method according to claim 1, wherein determining the symbol location based on the first starting symbol comprises:
    determining a N-th symbol after the first starting symbol as a third starting symbol for transmitting the TB; and
    determining the symbol location based on the third starting symbol, wherein the third starting symbol is a starting symbol location for transmitting the TB.

11. The transmission method according to claim 10, wherein the N-th symbol is determined based on a predefined rule;
    or
    the N-th symbol is determined based on an indication from a network device.

12. A communication apparatus, comprising:
    at least one processor; and
    a memory configured to store executable instructions by the at least one processor;
    wherein the at least one processor is configured to:
    determine that a scheduling period for a transport block (TB) is a non-integer semi-static scheduling period; and
    determine a symbol location for transmitting the TB;
    wherein in determining the symbol location for transmitting the TB, the at least one processor is further configured to:
    determine a first starting symbol, wherein the first starting symbol is located at a beginning of the semi-static scheduling period; and
    determine the symbol location based on the first starting symbol.

13. The communication apparatus according to claim 12, wherein in determining the symbol location based on the first starting symbol, the at least one processor is further configured to:
    determine a second starting symbol, wherein the second starting symbol is a preset starting symbol location for transmitting the TB determined based on a time domain resource allocation (TDRA) table; and
    determine the symbol location based on an order of the first starting symbol and the second starting symbol.

14. The communication apparatus according to claim 13, wherein in determining the symbol location based on the order of the first starting symbol and the second starting symbol, the at least one processor is further configured to:
    determine that the first starting symbol follows the second starting symbol; and
    determine a first slot and the symbol location within the first slot;
    wherein the first slot is a next adjacent slot of a slot where the second starting symbol is located.

15. The communication apparatus according to claim 13, wherein in determining the symbol location based on the order of the first starting symbol and the second starting symbol, the at least one processor is further configured to:
    determine that the first starting symbol follows the second starting symbol; and
    determine the symbol location based on the first starting symbol;

or determine that the first starting symbol is before the second starting symbol; and determine the symbol location based on the second starting symbol.

16. The communication apparatus according to claim 12, wherein in determining the symbol location based on the first starting symbol, the at least one processor is further configured to:

determine the first starting symbol as a third starting symbol for transmitting the TB; and determine the symbol location based on the third starting symbol;

or determine a N-th symbol after the first starting symbol as a third starting symbol for transmitting the TB; and determine the symbol location based on the third starting symbol;

wherein the third starting symbol is a starting symbol location for transmitting the TB.

17. The communication apparatus according to claim 12, the at least one processor is further configured to:

determine that a slot where a third starting symbol for transmitting the TB is located is different from a slot where an end symbol location of the TB is located; and determine a second slot, and re-determine the symbol location within the second slot;

wherein the second slot is a next adjacent slot of a slot where the third starting symbol is located.

18. A non-transitory computer-readable storage medium, wherein instructions in the storage medium, when are executed by at least one processor of a mobile terminal, cause the mobile terminal to perform operations comprising:

determining that a scheduling period for a transport block (TB) is a non-integer semi-static scheduling period; and determining a symbol location for transmitting the TB, wherein determining the symbol location for transmitting the TB comprises:

determining a first starting symbol, wherein the first starting symbol is located at a beginning of the semi-static scheduling period; and determining the symbol location based on the first starting symbol.

\* \* \* \* \*